(12) United States Patent
Giusti

(10) Patent No.: US 9,128,794 B2
(45) Date of Patent: Sep. 8, 2015

(54) METHOD FOR UPDATING A WEB PACKAGE WITHIN A MANUFACTURING EXECUTION SYSTEM AND MANUFACTURING EXECUTION SYSTEM

(75) Inventor: Nadia Giusti, Chiavari (IT)

(73) Assignee: Siemens Aktiengesellschaft, Munich (DE)

( * ) Notice: Subject to any disclaimer, the term of this patent is extended or adjusted under 35 U.S.C. 154(b) by 61 days.

(21) Appl. No.: 13/366,526

(22) Filed: Feb. 6, 2012

(65) Prior Publication Data

US 2012/0204170 A1 Aug. 9, 2012

(30) Foreign Application Priority Data

Feb. 4, 2011 (EP) .................................. 11153374

(51) Int. Cl.
*G06F 9/44* (2006.01)
*G06F 9/445* (2006.01)

(52) U.S. Cl.
CPC ....................................... *G06F 8/65* (2013.01)

(58) Field of Classification Search
CPC ............................... G06F 8/65; G06F 9/44505
USPC .................................................. 717/170–172
See application file for complete search history.

(56) References Cited

U.S. PATENT DOCUMENTS

| | | |
|---|---|---|
| 2005/0223372 A1 | 10/2005 | Borchers |
| 2006/0036993 A1* | 2/2006 | Buehler et al. ................ 717/104 |
| 2006/0294506 A1* | 12/2006 | Dengler et al. ................ 717/131 |
| 2007/0271552 A1* | 11/2007 | Pulley ............................ 717/120 |

FOREIGN PATENT DOCUMENTS

EP 2 234 054 A1 9/2010

OTHER PUBLICATIONS

Baranovskis, Migrating User Personalizations and Customizations in WebCenter Spaces, Aug. 29, 2010, p. 1-10.*
Harvey, "Oracle Fusion Middleware Administrator's Guide for Oracle WebCenter", Nov. 2010, 88 pages.*
http://msdn.microsoft.com/en-us/library/c6zyy3s9.aspx, p. 7.

* cited by examiner

*Primary Examiner* — Li B Zhen
*Assistant Examiner* — Duy Khuong Nguyen
(74) *Attorney, Agent, or Firm* — Laurence A. Greenberg; Werner H. Stemer; Ralph E. Locher

(57) ABSTRACT

In order to update an installed web package within a manufacturing execution system (MES) the below described steps are performed. A web package update is stored in a packages repository of a file system for the manufacturing execution system. The web package is updated by installing the web package update. At least one user customizable setting is preserved that is applied to the web package prior to the updating and applying the preserved at least one user customizable setting to the web package after the updating of the web package.

14 Claims, 4 Drawing Sheets

METHOD FOR UPDATING A WEB PACKAGE WITHIN A MANUFACTURING EXECUTION SYSTEM AND MANUFACTURING EXECUTION SYSTEM

CROSS-REFERENCE TO RELATED APPLICATION

This application claims the priority, under 35 U.S.C. §119, of European Application EP 11 153 374, filed Feb. 4, 2011; the prior application is herewith incorporated by reference in its entirety.

BACKGROUND OF THE INVENTION

Field of the Invention

The present invention relates to a method and a system for updating a web package within a manufacturing execution system.

As disclosed in published, European patent application EP 2 234 054 A1 it is well known, a method for scheduling manufacturing processes planned by an enterprise resource planning (ERP) and produced by a shop floor, provides a manufacturing execution system (MES) for scheduling and implementing the scheduled manufacturing processes and controlling the corresponding production steps at plant floor.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etceteras, while the term "shop floor" has been used to indicate a system supporting the control of single machines involved in the manufacturing processes, for example by measuring the number of pieces produced per hour by each machine or the functioning parameters thereof, the quality of the pieces produced and so on.

MES is an intermediate layer providing computing machines and software tools between the ERP upper layer and the shop floor lower layer, including a software tool for production order management, which receives requests of production from the ERP, and a software tool for production modeling, which supports the phases of selecting and managing the resources to be involved in the manufacturing processes, i.e. employees, machines and materials, in order to realize a planned manufacturing process within required time constrains.

Therefore, manufacturing execution systems require modeling plant equipment for both scheduling and controlling activities. More particular, the manufacturing execution systems require reliable instruments in order to exchange web applications over the distributed multi-client architecture which is usually present in an ordinary manufacturing environment.

Typically, a web package is a compressed file that contains web application contents in the form of web pages, user controls, scripts, class library, images, lay-out information and any further element referring to an ASP.NET web application. With the use of the web package it is possible to create a compressed, encrypted and self-descriptive web package. Further, the deployment of its content by an administrative console can be regulated and the entire integration of its contents inside a web application can be controlled.

A web package usually contains a multitude of functionalities and can have a dependency on other web packages. During the engineering phase a web administrator is to decide which web packages have to be installed according to customer needs. A specialized application displays the dynamic content of the web package. These contents are closed into the web package and virtually provided by the web application.

The fundamental technical requirements for a web package in a manufacturing execution environment are the following:
a) The web package should be in a closed format;
b) Its authenticity must be guaranteed entirely; and
c) The content of the web package must be provided by a web application.

These implications require that the web package content must be encrypted, and in order to ensure that the content cannot be modified by adding, deleting or altering its content (pages, controls . . . ), the web package must be hashed, too.

As described in published, European patent application EP 2 234 054 A1, after being installed, a package can be updated. The update step is performed when a package with a new version number is stored into the packages repository on the file system. When a user selects from a dedicated administration web page a package that must be updated, the only possible activity performed by the user is the update functionality.

When the user selects the update phase, all contents of the package are evaluated and replaced on the file system or on the database (depending on the type of settings). For example, settings as visibility and roles of web pages contained into the package override the database contents related to this package information. If, after package installation the user has customized some of these settings, updating of the package replaces these "custom" settings with the standard settings of the package. As a consequence, user customizations will be lost.

SUMMARY OF THE INVENTION

It is therefore an objective of the present invention to overcome this shortcoming and to provide a method and a system for improved updating of an installed web package for a manufacturing execution system.

In accordance with the method, a web package update is stored in a packages repository of a file system for the manufacturing execution system. The web package is updated by installing the web package update for example on a web server. At least one user customizable setting that is applied to the installed web package prior to the updating is preserved and applied to the web package after the updating of the web package.

The manufacturing execution system is adapted to update an installed web package of the manufacturing execution system. The installed web package contains web application content. The manufacturing execution system contains a packages repository adapted to store a web package update, a web server adapted for having installed the web package on the web server, updating device adapted to update the installed web package by installing the web package update on the web server, and preserving device adapted to preserve at least one user customizable setting applied to the installed web package prior to an updating of the installed web package. The manufacturing execution system is further adapted to apply the preserved at least one setting to the web package after the updating of the web package.

The invention provides the advantage that after installation of a web package, if a user has made some customizations regarding for example settings of web pages the settings are preserved. This is a very fundamental functionality when, after installation of a package, the user must perform a lot of configuration work, for example regarding who can access pages (role settings), position inside the navigation tree, visibility, localization, and so on. This configuration phase can take several days and it is not acceptable for users to repeat these operations each time it is necessary to update a package.

According to a preferred embodiment, an override option and a preserve option which are selectable alternatively are provided. The override option contains the choice of overriding all users customizable settings with standard settings during the updating of the web package, thus the original settings will be restored. The preserve option contains the choice of preserving the at least one user customizable setting. The updating is performed as a consequence of choosing the preserve option.

For example, when the user selects the update phase, two options are showed: Override and Preserve. With the override option, all settings and fixes present in the package update will be available and user customization as position, visibility, role, localization, etc of web page and web controls present in the installed package will be overridden. Thus, the original information that is usually present and identical in the original installable web package and in the package updates will be re-applied.

With the preserve option however, it is possible for the user to select which settings are to be preserved when they have been configured after the package installation. In accordance with preferred embodiments, this option provides several selectable options that allow to selectively preserving a selection of the following settings of a web page.

Roles: During the phase of package creation, default roles are assigned to web pages. If the user established does not conserve this option, these default roles will be restored, and possible changes regarding these settings performed by the user will be lost. On the contrary, if the user selects the option to preserve a role, the customizations performed after the installation of the package will be preserved and the package roles settings will be ignored by the update phase.

Images: If images are selected to be preserved, icons linked to web pages can be preserved after the update.

Visibility: When a visibility of a web page is selected to be preserved, for example a web page of a navigation menu that was customized to be invisible before the update will also not be visible after the update.

Title: If this option is selected, it is possible to preserve a customized title associated to a web page and to present the title in the navigation menu. If this option is not selected, the default title of the web page, present in the installable package, will be restored.

Hierarchical structure: After installing a package, it is possible for a user to change the navigation structure (that is the way in which web pages are visited). If the user selects this option, the changed structure will be preserved. If not, it will be lost and the package standard navigation structure will be restored.

Localization: If this option is selected, the user can preserve customized titles and tooltips of web pages of the installed package. If a web page in the package is localized for example in English as "Home Page", after package installation the user can modify the title in "Home". If the user desires to preserve this customization, he must select this option. If he will not select this option, the default localization ("Home Page") present in the package update will replace the customized localization. Moreover, it is important to point out the fact that, selecting this option, if the user has introduced other localization languages besides the default localization languages supported by the web application in which the web package is installed, these settings will be preserved too.

Further details regarding localization in .NET application and Microsoft standard, are described in http://msdn.microsoft.com/en-us/library/c6zyy3s9.aspx.

According to a preferred embodiment, the user customizable setting therefore comprises a selection of a role of a user, an image, a visibility of a web page, a title associated with a web page, a hierarchical structure, and a localization of a web page.

According to another preferred embodiment, the at least one user customizable setting contains the step of extracting, preferably copying, the at least one user customizable setting from the installed web package prior to the updating and applying the extracted at least one user customizable setting to the installed web package after the updating of the web package.

According to another preferred embodiment, the preserve option contains the option of preserving all user customizable settings.

According to another embodiment, the method and MES applies to the MES and method described in published, European patent application EP 2 234 054 A1. This functionality is improved to guarantee to users to evaluate in which way update the package, and to preserve user data each time when it is necessary. In other words, according to this embodiment the method and MES is an evolution of EP 2 234 054 A1.

According to another preferred embodiment, all user customizable settings that are applied to the installed web package prior to the updating are preserved and applied to the installed web package after the updating of the web package.

Other features which are considered as characteristic for the invention are set forth in the appended claims.

Although the invention is illustrated and described herein as embodied in a method for updating a web package within a manufacturing execution system and manufacturing execution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
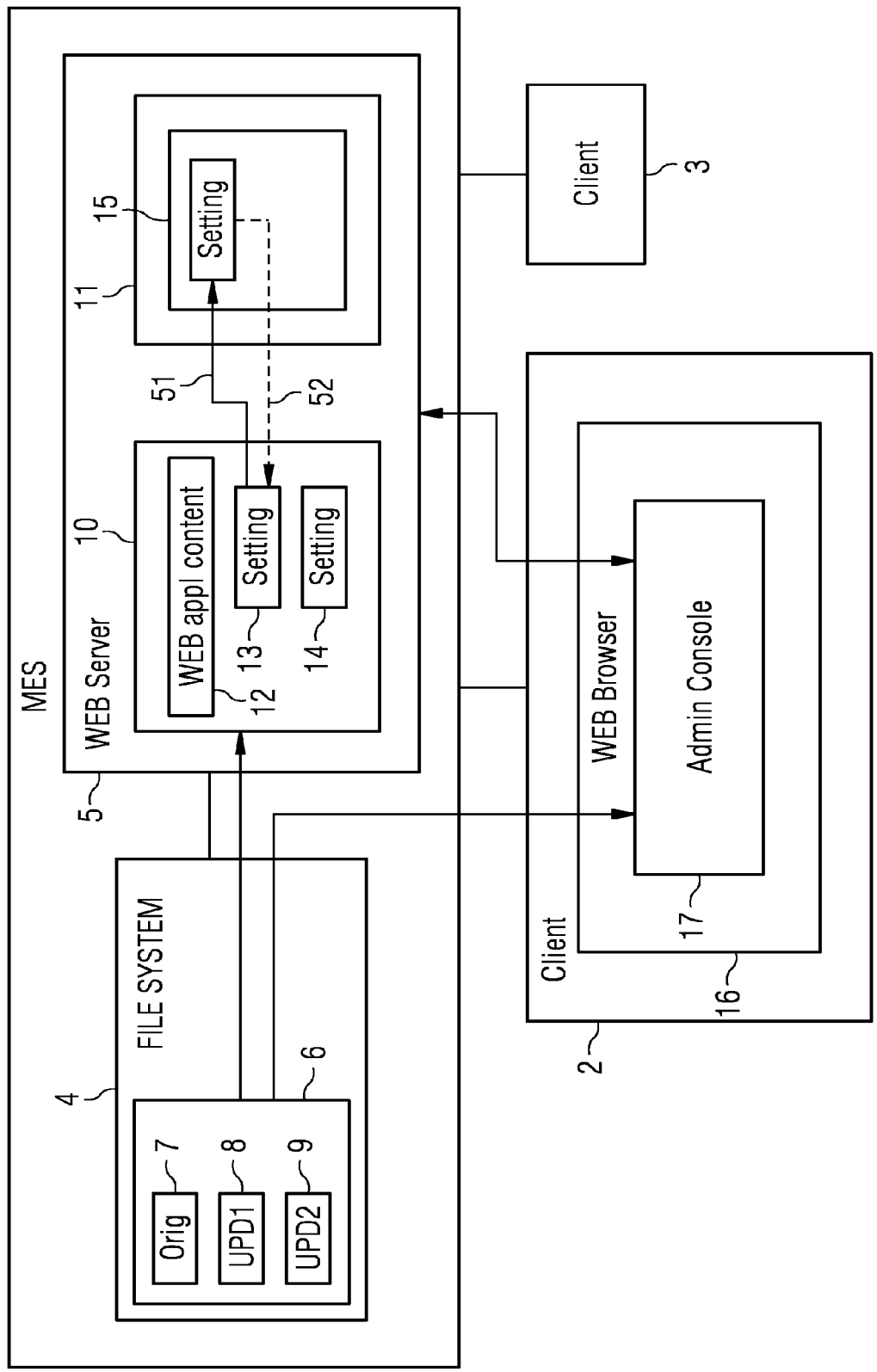
FIG. 1 is an illustration showing a manufacturing execution system (MES) that is connected to a plurality of client devices in accordance with an embodiment of the invention.

Referring now to the figures of the drawing in detail and first, particularly, to FIG. 1 thereof, there is shown an embodiment of a manufacturing execution system MES that is connected to a plurality of client devices 2, 3. The client devices 2, 3 can be connected to the MES or they can also be part of the MES. The manufacturing execution system MES contains a file system 4 and a web server 5. The file system 4 contains a packages repository 6. In the packages repository 6, an original installable web package 7 (i.e. first version packages) and or web package updates 8, 9 are storable in the form of installation code packages. This means that in the packages repository, web packages and web package updates 8, 9 are stored as installable code, in contrast to the web server, where web packages are installed and updated as installed applications. In the packages repository 6 reference numeral 7 relates to the original installable web package (carrying e.g. version number 1), while web package update 8 is the first update (version number 2) of the web package 7, and web package update 9 is the second update (version number 3) of the web package 7.

The web server 5 contains the installed web package 10 and updating device 11. The installed web package 10 contains web application content 12 and a plurality of user customizable settings 13, 14. The updating devices 11 has a preserving device 15 adapted to preserve at least one of the user customizable settings 13, 14 that is applied to the installed web package 10 prior to an updating of the installed web package 10, the preserving device 15 further adapted to apply the setting to the installed web package 10 after the updating of the installed web package 10.

In the course of the updating of an installed web package 10 with the latest web package update 9, the web server or some other part of the MES automatically performs the preserving of the at least one user customizable setting 13, 14 by extracting 51 the at least one user customizable setting 13, 14 from the installed web package 10 prior to the updating, stores 52 the extracted at least one setting 13, 14 in the preserving device 15 and applies the extracted at least one settings 13, 14 after updating to the installed web package 10 to the installed web package 10. Preferably the extracting of the at least one user customable setting 13, 14 contains copying the settings 13, 14 to the preserving device 15.

The client device 2 contains a web browser 16. An admin console 17 can be downloaded from the web server 5 to the web browser 16 and displayed on the client device 2. Of course, further client devices 3 identical or similar to client device 2 can be connected to the web server 5.

Figure 2:
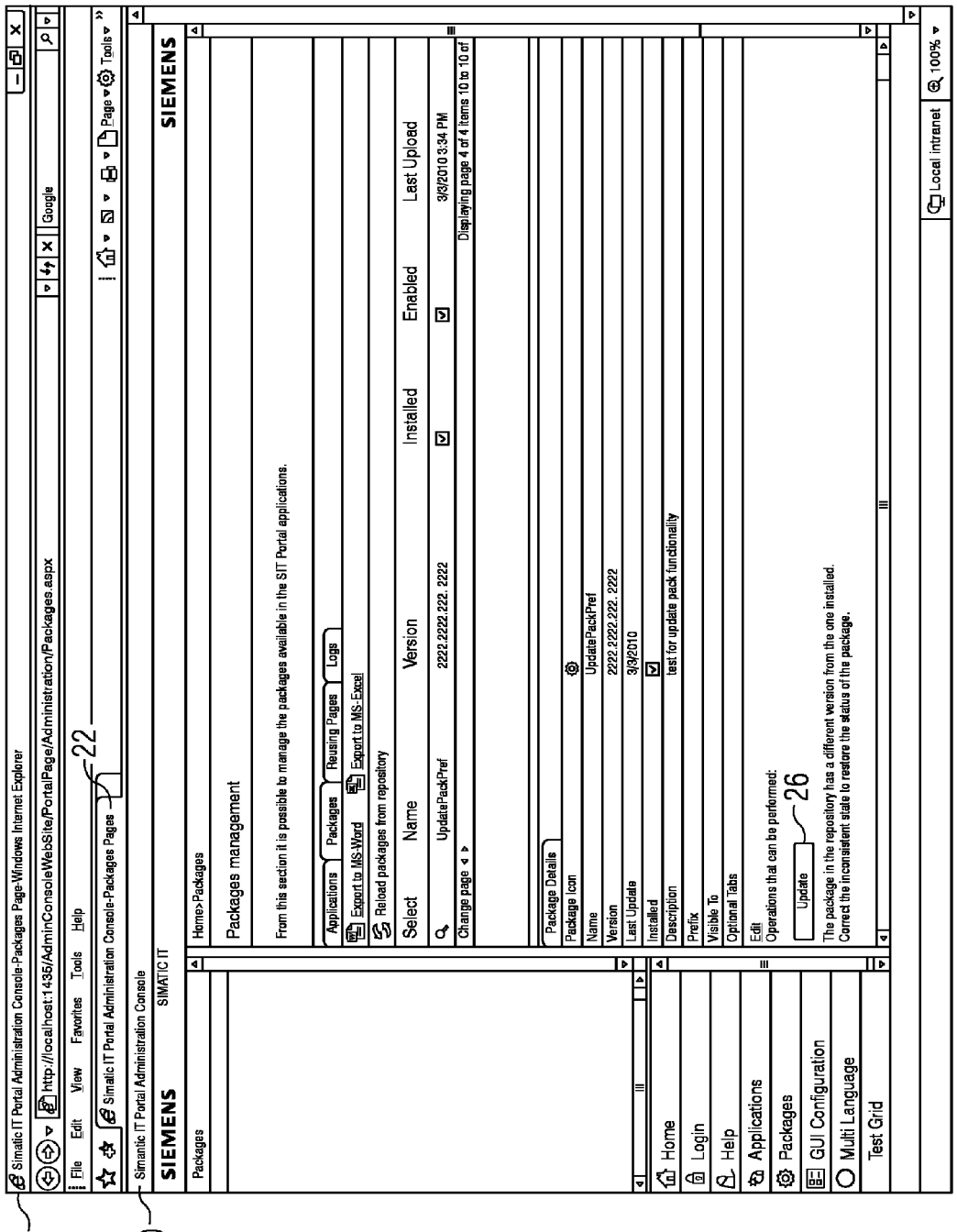
FIG. 2 is an illustration showing an admin console displaying a web package update for being installed in accordance with an embodiment of the invention.

FIG. 2 shows an admin console 20 displaying a web package update for being installed in an exemplary way on the basis of enhancements in SIMATIC IT Administration Console (SITAdminConsole) graphical user interface (GUI). After the web package update with a newer version number than the installed web package has been copied to the SIMATIC IT package repository (SIT CAB package repository), the SIT Administration Console website 22 shows the web package 24 suitable to be updated. If the user clicks an update button 26 displayed, an additional panel 28 as depicted in FIGS. 3 and 4 is shown, providing two options 30, 40 he can chose alternatively in order to specify the installation mode for this package update.

Figure 3:
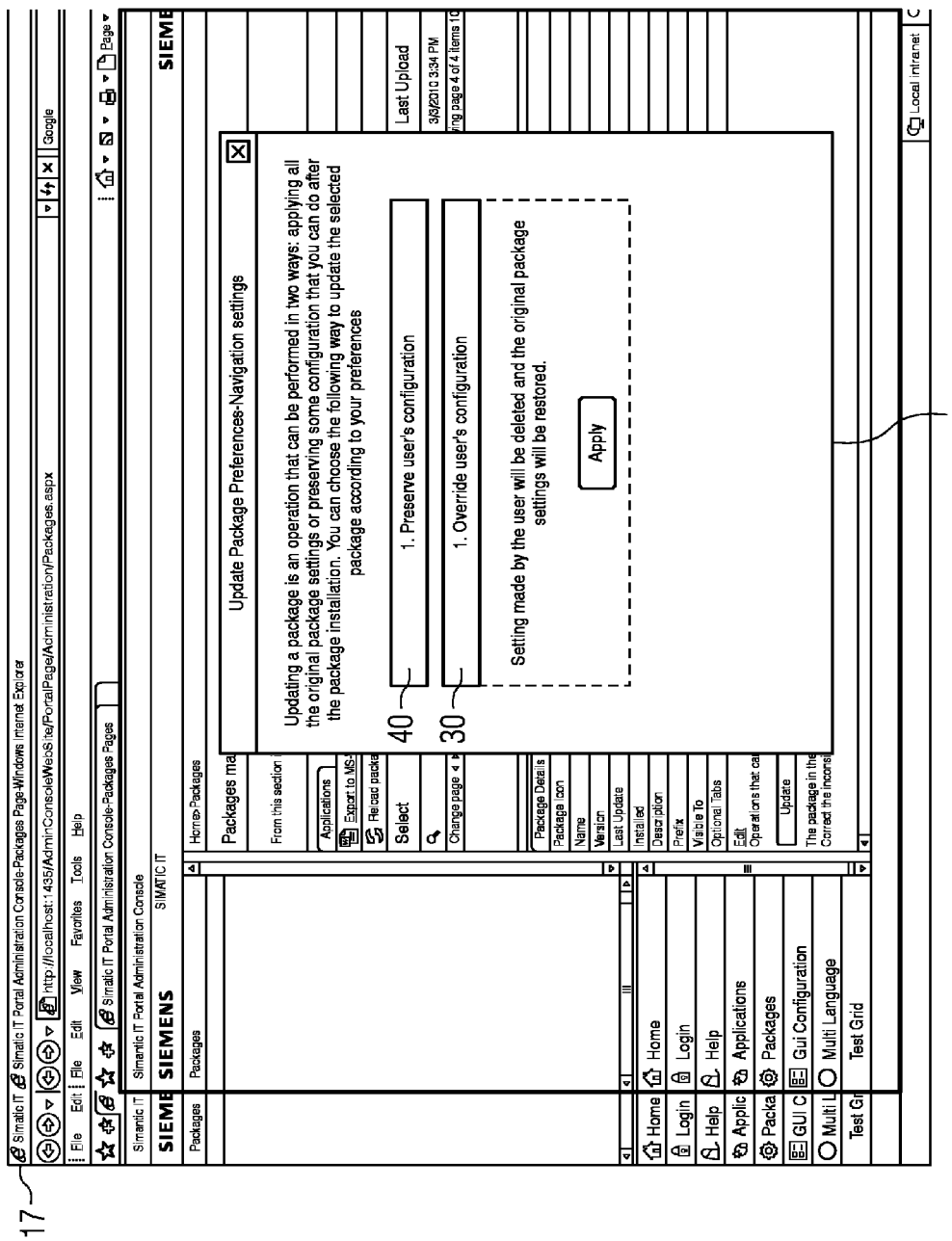
FIG. 3 is an illustration showing an admin console displaying an option to override all settings in the course of the installation of an a web package update in accordance with an embodiment of the invention.

FIG. 3 shows the admin console 20 displaying an override option 30 to override all settings in the course of the installation of a web package update. In case the user chooses the override option 30, the package will be rewritten and eventual previous customizations will be lost. In the override mode, checkboxes to select preserving action modes are disabled.

Figure 4:
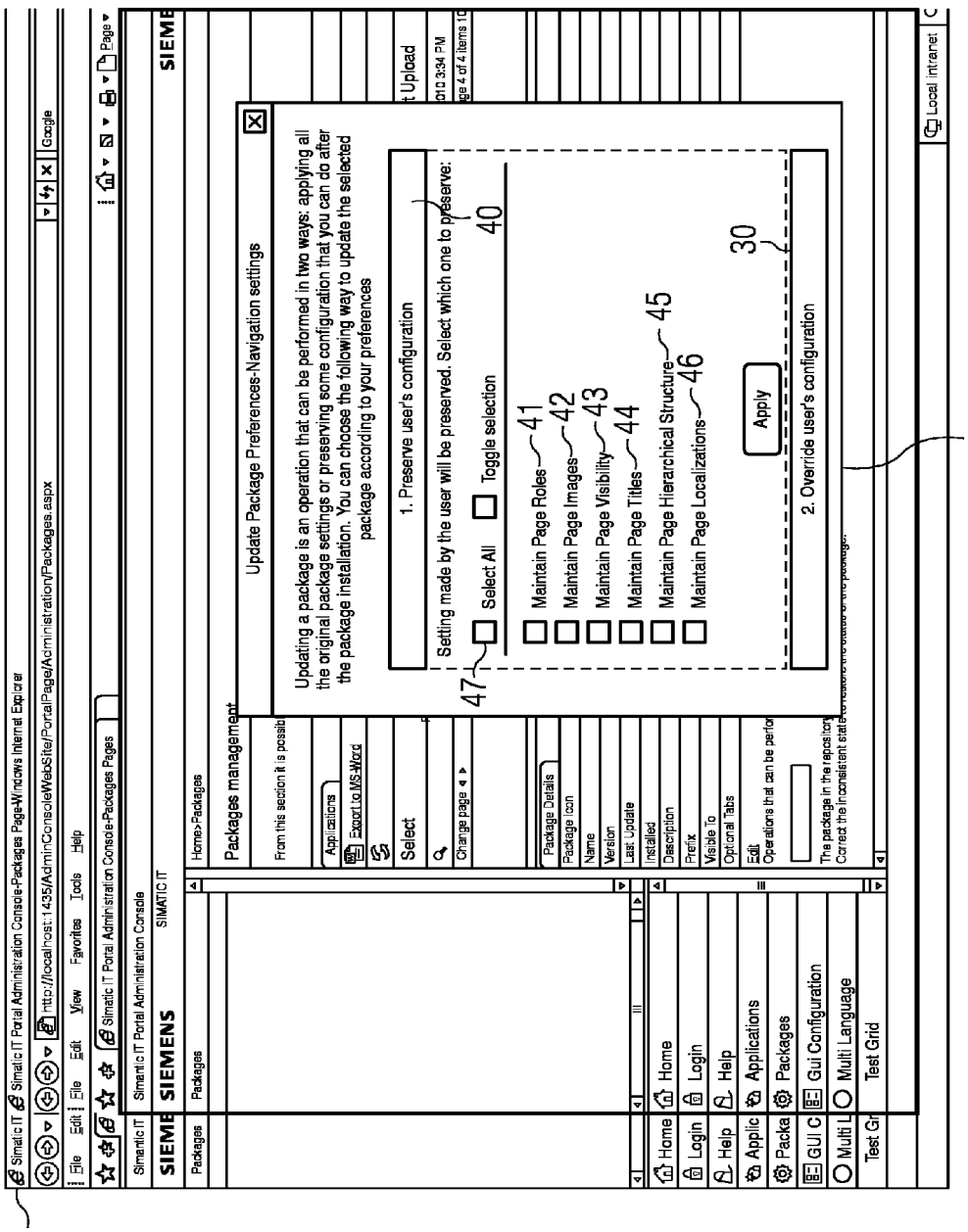
FIG. 4 is an illustration showing an admin console displaying an option to preserve at least one setting in the course of the installation of a web package update in accordance with an embodiment of the invention.

FIG. 4 shows an admin console 28 displaying an option 40, 41, 42, 43, 44, 45, 46, 47 to preserve at least one user customizable setting in the course of the installation of a web package update. In the example of FIG. 4, option 40 allows to choose the settings that are to be preserved. Option 47 allows to choose all user customizable settings to be preserved. Options 41-46 allow to selectively choose the desired settings or group of settings that are to be preserved.

If one or more of these settings 40-47 are selected by the user, the selected user customizable settings that were applied to the web package prior to the updating are applied to the web package after the updating of the web package.

A user can update a web package 10 for example by using an administration console 17, such as the SIMATIC IT Administration Console website. According to a preferred embodiment, the invention provides the now described actions.

An initial check is performed in order to define if the current installation deals with a new package or updates an already installed one.

In case the installation deals with an update 9, the user is asked by the administration console 17 for the desired installation mode. Thereby the administration console 17 provides two alternative options 30, 40, a preserve option 30 and an override option 40, one of which the user can set. If the user sets the override option 40, the update will occur in the override mode. Thereby the installation of the update package 9 will recreate the original settings without considering eventual modifications or customizations it can find. Customized settings 13, 14 that were performed by the user prior to the updating will therefore be lost at the end of installation. This mode could be used to make a fresh installation, removing unwanted customization. If the user sets the preserve option 40, the update will occur in the preserve mode. In the preserve mode the installation will try to update the web package installation 10 taking into account the pre-existent situation in that before going on with the installation, the user will be allowed to define specific actions to be executed for a subset of conflicts or particular conditions the installation procedure could face during its job (see next point).

In case the update occurs in the preserve mode, the user is asked to specify the action to be executed on specific conditions. The user has to define these actions before the actual installation phase is executed.

The updating phase is finally performed.

If the administration console is a SIMATIC IT Administration Console, in a preferred technical implementation the following SIMATIC IT Administration Console components are affected:
a) SIT Administration Console graphical user interface as described above;
b) SIT CAB Data/Business Layer; and
c) Package installation stored procedure, i.e. SQL Server code.

In the SIT CAB Data/Business Layer, enhancements to support this invention preferably comprise the refactoring of the code for scalability and participating in a database unique transaction.

In the package installation stored procedure, enhancements preferably comprise two new stored procedures to allow the user preferences evaluation:
a) sitcab_update_package_sitemapnode_userpreference (for navigation management); and
b) sitcab_update_package_sitemaplocalization_userpreference (for navigation localization management).

The old store procedures are maintained to preserve backward compatibility for all that use them in post install actions or directly from code.

The sitcab_update_package_sitemapnode store procedure is the same, otherwise the sitcab_update_package_sitemaplocalization is transformed in wrapper to call the new one with default user preferences set to "override".

a. The new parameters of the sitcab_update_package_sitemapnode_userpreference Store Procedure are:

@KeepRoles, a boolean data type that indicates if the node role value has to be overridden or preserved.
@KeepImages, a boolean data type that indicates if the node image url value has to be overridden or preserved.
@Keep Visibility, a boolean data type that indicates if the node visibility value has to be overridden or preserved.
@KeepTitles, a boolean data type that indicates if the node title value has to be overridden or preserved.
@KeepHierarchy, a boolean data type that indicates if the nodes hierarchy has to be overridden or preserved.

This stored procedure does the now described.

Delete records that are already present in database but not anymore in the package.

Update records that are already present in database evaluating the new parameters in order to override or preserve according to user directives.

Insert nodes that are new in the package and do not exist in the database yet.

Updating nodes hierarchy by taking into account if a node is already present (and has to be overridden or preserved) and newly inserted ones.

Update invisible nodes under the root of the package, evaluating the keep hierarchy parameter.

b. The new parameters of thesitcab_update_package_sitemaplocalization_userpreference Store Procedure is:

@KeepLocalizationConfiguration, a boolean that indicates if title and description localization values has to be override or preserved.

When users select preserve option, also the localizations for custom languages (languages added by users and not supported by default from SIT Portal—the only languages support by SIT Portal are Italian, English, German and Chinese) are maintained, otherwise they're override and all the customization work is lost permanently.

Customization work can consist in several actions: add a custom language to the SIT Portal and add some localization for this new language from the page that manages the navigation tree, add a post install action with a script execution that contains a list of localization (for languages not supported by the SIT Portal), call the stored procedure directly from code to add custom localization items, and so on.

The invention claimed is:

1. A method for updating an installed web package within a manufacturing execution system (MES), the web package containing web application content, the method which comprises the steps of:
    a) storing a web package update in a packages repository of a file system for the manufacturing execution system (MES);
    b) updating the web package by installing the web package update; and
    c) preserving at least one user customizable setting that is applied to the web package prior to the updating and applying the at least one user customizable setting to the web package after the updating of the web package;
    wherein the user customizable setting is selected from the group consisting of a selection of a role of a user, an image, a visibility of a web page, a title associated with a web page, a hierarchical structure, a localization of a web page; and
    wherein a boolean data type indicates whether the user customizable setting has to be overridden or preserved.

2. The method according to claim 1, wherein the at least one user customizable setting includes at least one setting selected from the group consisting of a role of a user, an image, a visibility of a web page, a title associated with a web page, a hierarchical structure, and a localization of a web page.

3. The method according to claim 1, wherein the step of preserving the at least one user customizable setting further comprises the step of extracting the at least one user customizable setting from the installed web package prior to the updating and applying the at least one user customizable setting extracted to the installed web package after the updating of the web package.

4. The method according to claim 1, which further comprises providing an override option including a choice of overriding all user customizable settings with standard settings during the updating of the web package, wherein the override option is selectable as an alternative to the preserve option.

5. The method according to claim 4, wherein the preserve option comprises an option of preserving all of the user customizable settings.

6. The method according to claim 4, which further comprises performing the method step c) by preserving of all the user customizable settings that are applied to the web package prior to the updating and applying all preserved user customizable settings to the web package after the updating of the web package.

7. The method according to claim 1, wherein the web package installed is comprised by a web server.

8. A manufacturing execution system (MES) adapted to update an installed web package of the manufacturing execution system (MES), the installed web package containing web application content, the manufacturing execution system (MES) comprising:
    a packages repository adapted to store a web package update;
    a web server adapted for installing the web package on the web server;
    updating means adapted to update the web package installed by installing the web package update on said web server;
    preserving means adapted to preserve at least one user customizable setting applied to the web package installed prior to an updating of the installed web package;
    wherein the manufacturing execution system (MES) is adapted to preserve the selected at least one user customized setting during the updating of the web package and to apply the selected at least one user customizable setting to the web package after the updating of the web package;
    wherein the user customizable setting is selected from the group consisting of a selection of a role of a user, an image, a visibility of a web page, a title associated with a web page, a hierarchical structure, a localization of a web page; and
    wherein a boolean data type indicates whether the user customizable setting has to be overridden or preserved.

9. The manufacturing execution system (MES) according to claim 8, wherein the user customizable setting includes a selection of a role of a user, an image, a visibility of a web page, a title associated with a web page, a hierarchical structure, and a localization of a web page.

10. The manufacturing execution system (MES) according to claim 8, wherein said preserving means is further adapted to extract the at least one user customizable setting from the installed web package prior to the updating and to apply the extracted user customizable setting to the installed web package after the updating of the web package.

11. The manufacturing execution system (MES) according to claim 8, wherein the manufacturing execution system is adapted to provide an override option including a choice of overriding all the user customizable settings with standard settings during the updating of the web package.

12. The manufacturing execution system (MES) according to claim 11, wherein the preserve option contains a choice of preserving all the user customizable settings.

13. The manufacturing execution system (MES) according to claim 8, wherein said preserving means are further adapted to preserve all the user customizable settings that are applied to the web package prior to the updating and applying all preserved user customizable settings to the web package after the updating of the web package.

14. The manufacturing execution system (MES) according to claim 8, wherein the installed web package is part of said web server.

* * * * *